Figure 1:
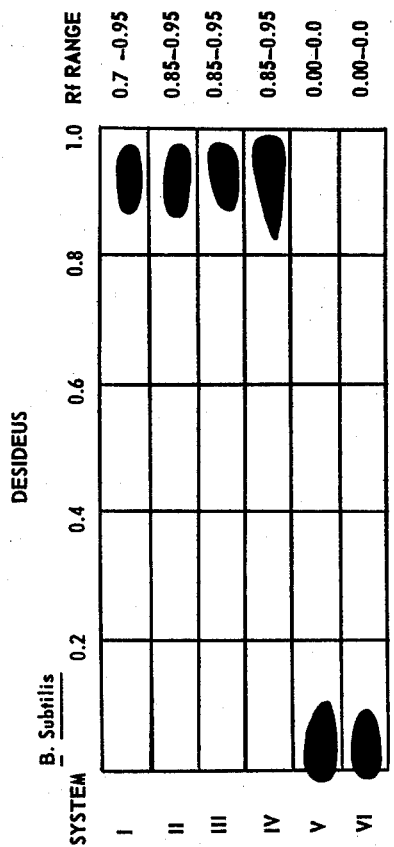

May 11, 1965  G. W. CAMIENER ETAL  3,183,155
ANTIBIOTIC DESIDEUS AND METHOD OF PRODUCTION
Filed April 10, 1962  3 Sheets-Sheet 1

G. W. CAMIENER
G. B. WHITFIELD
P. F. WILEY
INVENTOR.

PROTON MAGNETIC RESONANCE SPECTRUM OF DESIDEUS

United States Patent Office 3,183,155
Patented May 11, 1965

3,183,155
ANTIBIOTIC DESIDEUS AND METHOD
OF PRODUCTION
Gerald W. Camiener, George B. Whitfield, Jr., and Paul F. Wiley, Kalamazoo, Mich., assignors to The Upjohn Company, Kalamazoo, Mich., a corporation of Delaware
Filed Apr. 10, 1962, Ser. No. 186,427
9 Claims. (Cl. 167—65)

This invention relates to a novel composition of matter and to a process for the production thereof. More particularly this invention relates to a new compound, desideus, and to a process for the production thereof.

Desideus is a biosynthetic product obtained as an elaboration product of a desideus-producing actinomycete. It is a neutral compound which has a property of adversely affecting the growth of certain organisms, particularly bacteria, for example, *Bacillus subtilis*, *Bacillus cereus*, and *Streptococcus lactis*, and tumor cells. Desideus can be used alone or in combination with other antibacterial or antitumor agents to prevent the growth of or reduce the number of such organisms or cells present in various environments.

The actinomycete used according to this invention for the production of desideus has been designated as *Streptomyces griseus* var. *desideus*. One of its strain characteristics is the production of desideus. A subculture of this variety can be obtained from the permanent collection of the Northern Utilization and Research Division, Agricultural Research Service, U.S. Department of Agriculture, Peoria, Illinois, U.S.A. Its accession number in this repository is NRRL 2971.

*Streptomyces griseus* var. *desideus* has yellowish gray aerial growth and yellowish gray or light to moderate olive reverse on most media. This organism has straight to flexuous spore chains as seen by the light microscope and a smooth spore surface as seen by electron micrograph. Its growth characteristics on standard biological media and its carbon assimilation pattern are given in the following tables.

TABLE I.—APPEARANCE ON EKTACHROME *

| Agar Medium | Surface | Reverse |
| --- | --- | --- |
| 1. Bennett's | Gray pink | Yellow tan. |
| 2. Czapek's sucrose | White | Colorless. |
| 3. Maltose tryptone | Gray pink | Tan. |
| 4. Peptone iron | Colorless | Colorless. |
| 5. 0.1% tyrosine | Trace gray pink | Red tan. |
| 6. Casein starch | Gray pink | Gray pink. |

* Dietz, A., Ektachrome transparencies as aids in actinomycete classification, Annals of the N.Y. Academy of Science 60: 152–154, 1954.

TABLE II.—ASSIMILATION OF CARBON COMPOUNDS IN SYNTHETIC MEDIUM *

Control (−)    Lactose (−)        Inositol (−)
D-xylose +     Cellobiose +       Salicin (+)
L-arabinose (+) Raffinose (−)     Na formate (−)
Rhamnose (−)   Dextrin +          Na oxalate −
D-fructose (+) Inulin (−)         Na tartrate (−)
D-galactose (+) Soluble starch +  Na salicylate −
D-glucose +    Glycerol +         Na acetate +
D-mannose +    Dulcitol (−)       Na citrate +
Maltose +      D-mannitol (+)     Na succinate +
Sucrose (−)    D-sorbitol (+)

*Pridham, T. G., and Gottlieb, D., "Assimilation of Carbon Compounds in Synthetic Medium," J. Bact. 56; 107–114, 1948.
+ Positive assimilation.
− Negative assimilation.
(−) Slight growth—no assimilation.
(+) Positive asimilation—only slight growth.

TABLE III.—CULTURAL CHARACTERISTICS

| Medium | Aerial growth | Vegetative growth | Other |
| --- | --- | --- | --- |
| Plain gelatin | Trace white | Colorless | Complete liquefaction. |
| Nutrient gelatin | do | do | Do. |
| Nutrient nitrate broth | Cream | Yellow | Surface ring. Yellow pigment. No reduction. |
| Synthetic nitrate broth | do | Greenish tinge. | Surface pellicle. Trace yellow pigment. No reduction. |
| Litmus milk | Trace cream | Blue | Surface ring. Peptonization pH 7.8. |
| Peptone iron agar | Pale pink | Yellow tan | No H₂S darkening. |
| Calcium malate agar | Cream | Cream | Malate solubilized. |
| Skim milk agar | Trace pink | Yellow tan | Yellow tan pigment. Casein hydrolyzed. |
| Glucose asparagine agar | Cream pink | Cream | None. |
| Casein starch agar | Cream | Cream pink | Starch hydrolyzed. |
| Nutrient starch agar | do | Yellow | Do. |
| Tyrosine agar | do | Yellow tan | Yellow tan pigment. Tyrosine solubilized. |
| Xanthine agar | do | Yellow | Xanthine partially solubilized. |
| Maltosetryptone agar | Olive gray | Olive brown | Yellow tan pigment. |
| Bennett's agar | do | Olive | |
| Czapek's sucrose agar | do | Cream | |

The new compound of the invention is produced when the elaborating organism is grown in an aqueous nutrient medium under submerged aerobic conditions. It is to be understood also that for the preparation of limited amounts surface cultures in bottle can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewer's yeast with milk solids, soybean meal, cottonseed meal, corn meal, milk solids, panacreatic digest of casein, distillers' solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like need not be added to the fermentation media since tap water and unpurified ingredients are used as media components.

Production of the compound of the invention can be effected at any temperature conducive to satisfactory growth of the microorganism, for example, between about 18° and 40° C. and preferably between about 26° and 30° C. Ordinarily, optimum production of the compound is obtained in about 2 to 10 days. The medium normally stays fairly close to neutral, or on the alkaline side, during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The novel compound of the invention is soluble in water-immiscible polar organic solvents, for example, ethyl acetate, amyl acetate, butyl acetate, and like aliphatic esters; 1-butanol, 2-butanol, and like aliphatic alcohols; methyl ethyl ketone, methyl iso-butyl ketone, and like alkanones; or chloroform, methylene chloride and like halogenated hydrocarbons; and water-miscible organic solvents for example, methanol, ethanol, and like alcohols; and hydrocarbon solvents, for example, benzene and toluene; and is relatively insoluble in water.

A variety of procedures can be employed in the isolation and purification of desideus, for example, solvent extraction, liquid-liquid distribution in a Craig apparatus, the use of adsorbents, and crystallization from solvents. In a preferred process, desideus is recovered from its culture medium by separation of the mycelium from the filtrate, extraction of the mycelium with a water-miscible organic solvent for desideus, and purification by fractional liquid-liquid extraction in a Craig counter-current distribution apparatus, using such solvent systems as Skellysolve B (isomeric hexanes):acetone:buffer (pH 7.5) 175:400:75.

Further purification, to remove organic acids present, may be effected by use of strongly basic anion exchange resins. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene crosslinked, if desired, with divinylbenzene prepared by the procedure given on page 84 of Kunin, supra, and quaternizing with trimethylamine, or dimethylethanolamine by the procedure given on page 97 of Kunin, supra. Anion exchange resins of this type are marketed under the trade names Dowex 2, Dowex 2–X8, Dowex 8, Amberlite IRS–400, Duolite A–102, and Permutit S–1.

In accordance with a preferred procedure for the recovery of the new compound of the invention the whole beer is adjusted, if necessary, to a near neutral pH or below and filtered. A filter aid, for example, diatomite, can be used. The clarified beer is discarded, and the washed mycelial cake is treated with a substantially water-miscible organic solvent, for example, methanol to extract the desideus therefrom. The volatile solvent is removed from the extract in vacuo, and the aqueous residue is extracted with a water-immiscible organic solvent, for example, n-hexane, toluene, and ethyl acetate. The extract is passed through a chromatographic column, for example, a Florisil column (a mixture of magnesium and sodium trisilicate), to adsorb the antibiotic substance. The column can be developed with combinations of mixed solvent systems, for example, n-hexane:acetone, acetone:-methanol, and methanol. The fractions taken off the column are combined and evaporated to dryness in vacuo to give a residue which is then stirred with a water-immiscible solvent, for example, methylene chloride and filtered. The filtrates are then combined and filtered with the aid of a filter aid, for example, diatomaceous earth and then evaporated to dryness in vacuo. The residue is dissolved in an equal volume of a water-immiscible solvent, for example, n-hexane, and the solution refrigerated at a low temperature, for example, −10 to −20° C., until crystallization occurs. After crystallization occurs, the crystals can be washed with a small amount of n-hexane at the low temperature and air-dried.

The new compound of the invention, desideus, has a broad antibacterial spectrum as shown in Table IV.

TABLE IV.—ANTIBACTERIAL ACTIVITY OF DESIDEUS IN AGAR-PLATE TESTS

| Test organism: | Zone size, mm. |
| --- | --- |
| Bacillus subtilis | 12 |
| Bacillus cereus | 9 |
| Sarcina lutea | 9 |
| Staphylococcus aureus | 11 |
| Streptococcus faecalis | 10 |
| Streptococcus lactis | 11 |
| Mycobacterium phlei | 14 |
| Lactobacillus casei | 17 |

The new compound of the invention is active against Bacillus subtilis and can be used for treating breeding places of silk worms to prevent or minimize infections caused by this organism. It can also be used to minimize or prevent odor in fish and fish crates caused by this organism. Further, the new compound can be used as a disinfectant on various dental and medical equipment contaminated with Staphylococcus aureus; it can also be used as a disinfectant on washed and stacked food utensils contaminated with this organism and the organism Streptococcus faecalis.

The following examples are illustrative of the process and products of the present invention, but are not to be construed as limiting. All percentages are by weight and all solvent mixture proportions are by volume unless otherwise noted.

*Example 1*

(A) *Fermentation.*—A soil stock of Streptomyces griseus var. desideus, NRRL 2971, was used to inoculate a series of 500-ml. Erlenmeyer flasks each containing 100 ml. of sterile seed medium consisting of the following ingredients:

| | |
| --- | --- |
| Glucose monohydrate | grams__ 28 |
| Milled cottonseed meal | do____ 40 |
| Tap water, q.s. | liters__ 1 |

The seed was grown for three days at 28° C. on a Gump rotary shaker operating at 250 r.p.m.

One shake flask of the seed described above (100 ml.) was used to inoculate a 40 liter seed tank containing 20 liters of sterile seed tank medium consisting of the following ingredients:

| | |
| --- | --- |
| Glucose monohydrate | gram/liter__ 10 |
| Pharmamedia [1] | do____ 2 |
| Cornsteep liquor | do____ 10 |
| Wilson's Peptone Liquor No. 159 [2] | do____ 10 |
| Lard oil | ml./liter__ 2 |
| Tap water | Balance |

[1] Pharamedia is an industrial grade of cottonseed flour produced by Traders Oil Mill Co., Fort Worth, Tex.
[2] Wilson's Peptone Liquor No. 159 is a preparation of hydrolyzed proteins of animal origin.

The seed tank medium presterilization pH was 7.2. The seed tank was grown for 24 hours at a temperature of 28° C., with aeration at a rate of 10 standard liters/min., and agitation at a rate of 400 r.p.m.

12.5 liters from the seed tank, described above, was then used to inoculate a 380-liter fermentor containing 250 liters of the following sterile medium:

| | |
| --- | --- |
| Glucose monohydrate | gram/liter__ 20 |
| Yeast | do____ 2.5 |
| Sodium chloride | do____ 3 |
| Calcium carbonate | do____ 4 |
| Ammonium sulfate | do____ 5 |
| Kaysoy [1] | do____ 10 |
| Lard oil | ml./liter__ 2 |
| Tap water | Balance |

[1] Kaysoy is a fat-extracted, finely-milled, soybean meal.

The fermentor tank medium presterilization pH was 6.4. The fermentation cycle was four days during which time the temperature was controlled at 28° C., filtered air was supplied at a rate of 100 standard liters/minute, and agitation was at the rate of 280 r.p.m. Sterile lard oil was added periodically to control foaming during the entire fermentation.

(B) *Extraction.*—The above described fermentation was run in duplicate and then the whole broth from the two fermentors was pooled, slurried with 4% diatomaceous earth and filtered. The filtered beer was discarded. The mycelial cake was extracted four times with methanol and the extracts concentrated in vacuo to an aqueous (20 liters). The aqueous concentrate was then extracted twice with ¼ volume of Skellysolve B (trade name, Skelly Oil Company, Kansas City, Missouri, essentially n-hexane B.P. 60–68°), four times with ¼ volume of toluene and twice with ¼ volume of ethyl acetate. These organic extracts were each concentrated separately to an oil and the remaining aqueous concentrate was freeze-dried. These solvent extractions gave the following preparations:

| Preparation | Source | Weight, g. |
| --- | --- | --- |
| 1 | Skellysolve B extraction | 323.4 |
| 2 | Toluene extraction | 179.8 |
| 3 | Ethyl acetate extraction | 78.9 |
| 4 | Spent aqueous dried | 855 |

(C) *Purification.*—Preparation one (323.4 g.) from the above described Skellysolve B extraction contained the majority of the activity and was purified in the following manner. Ten grams of this preparation was distributed in the 1000 tube Craig counter-current apparatus (CCD) using a solvent system of Skellysolve B:acetone:triethylamine buffer (pH 7.5), at a ratio of 175:400:75. After 1500 transfers, the aqueous and organic phases were separated. Fractions from each were then pooled and evaporated to dryness. The solids and assay pattern on these fractions were as follows:

| Fractions | Tubes | Solids, g. | Assay, KBU/mg.* |
| --- | --- | --- | --- |
| 1a (aqueous) | 1,130–1,360 | 3.27 | 238 |
| 1b (solvent) | 1,130–1,360 | 0.55 | 172 |
| 2a (aqueous) | 1,360–1,460 | 1.81 | 27 |
| 2b (solvent) | 1,360–1,460 | 0.17 | 152 |

*This tissue culture assay is a measure of the inhibition of protein synthesis in a tissue culture using KB cells.

$$\text{KBU/unit of material (mg. or ml.)} = \frac{\text{that dilution of 1 unit of material which effects a 50\% inhibition of protein synthesis}}{1000}$$

One gram of fraction 1a from the above described CCD was dissolved in 10 ml. of methanol and passed through a column containing 30 g. of a 50–100 mesh, 8% divinylbenzene, croslinked polystyrene, dimethyl ethanol benzyl ammonium anion exchange resin prepared according to U.S. Patent 2,591,573. The column was prepared in the following manner. 30 g. of anion exchange resin was slurried in methanol and poured into a 50 ml. burette. The substrate was placed on top of the column and the column developed with 75 ml. of methanol. The methanol was concentrated to a residue giving 0.34 gram of a light brown viscous material. This material was then dissolved in 0.35 ml. of Skellysolve B and chilled. The resultant crystals of the antibiotic desideus were washed with 0.5 ml. of cold Skellysolve B and dried to give 0.16 gram (preparation PFW-109.1) having a melting point of approximately 47° C. and exhibiting an activity of 4.75 *B. subtilis* units per milligram.

Additional crystals of desideus were prepared by using a Florisil column. 450 grams of Florisil were slurried in Skellysolve B and packed into a two inch I.D. glass column. Fifteen grams of preparation one, previously described in Part B, were dissolved in methylene chloride and placed on the column. The column was eluted with one liquid holdup (ca. 500 ml.) of each of the following solvent combinations:

| Fraction No. | Solvent added | Eluate | Wt., g. |
| --- | --- | --- | --- |
| 1 | Skellysolve B (SSB) | SSB | |
| 2 | SSB-acetone (8:2) | SSB | |
| 3 | SSB-acetone (6:4) | SSB-acetone (8:2) | 6.82 |
| 4 | SSB-acetone (4:6) | SSB-acetone (6:4) | 0.37 |
| 5 | SSB-acetone (2:8) | SSB-acetone (4:6) | |
| 6 | Acetone | SSB-acetone (2:8) | |
| 7 | Acetone-methanol (8:2) | Acetone | |
| 8 | Acetone-methanol (6:4) | Acetone-methanol (8:2) | 0.52 |
| 9 | Acetone-methanol (4:6) | Acetone-methanol (6:4) | 0.52 |
| 10 | Acetone-methanol (2:8) | Acetone-methanol (4:6) | 1.98 |
| 11 | Methanol | Acetone-methanol (2:8) | 1.70 |
| 12 | do | Methanol | 0.58 |

Fractions 10, 11, and 12 were combined and extracted with three 50-ml. portions of methylene chloride. The combined methylene chloride extracts were filtered through celite, dried over anhydrous sodium sulfate and evaporated in vacuo to a residue (660 mg.). This residue was dissolved in 0.7 ml. of Skellysolve B and crystallization occurred. The crystals of the antibiotic desideus were collected and washed with cold Skellysolve B and dried to give 0.41 gram (preparation 113.15) having a melting point range of 53–61° C. and exhibiting an activity of 5.0 *B. subtilis* units per milligram.

The above Florisil procedure was repeated two more times to give a combined total of 0.84 gram for the three crystalline desideus preparations.

The desideus crystals (0.16 gram) obtained via the Craig countercurrent and ion exchange resin procedure, as previously described, and the desideus crystals (0.84 gram) obtained via the Florisil procedure, described above, were then combined and recrystallized by first dissolving the crystals in Skellysolve B at a concentration of ca. 1 gram/2 ml. The solution was filtered through a celite pad and refrigerated at −15° C. The crystals were then removed by filtration and washed with cold Skellysolve B to yield 0.2 gram of desideus having a melting point range of 51–63° C., no significant ultraviolet absorption spectrum in the 220–320 m$\mu$ range, a papergram with $R_f$ values as shown in Table V—

TABLE V

Solvent systems:                  $R_f$ values
I ------------------------------------- 0.95
II ------------------------------------ 0.95
III ----------------------------------- 0.95
IV ------------------------------------ 0.95
V -------------------------------------- 0
VI ------------------------------------- 0

Figure 2:
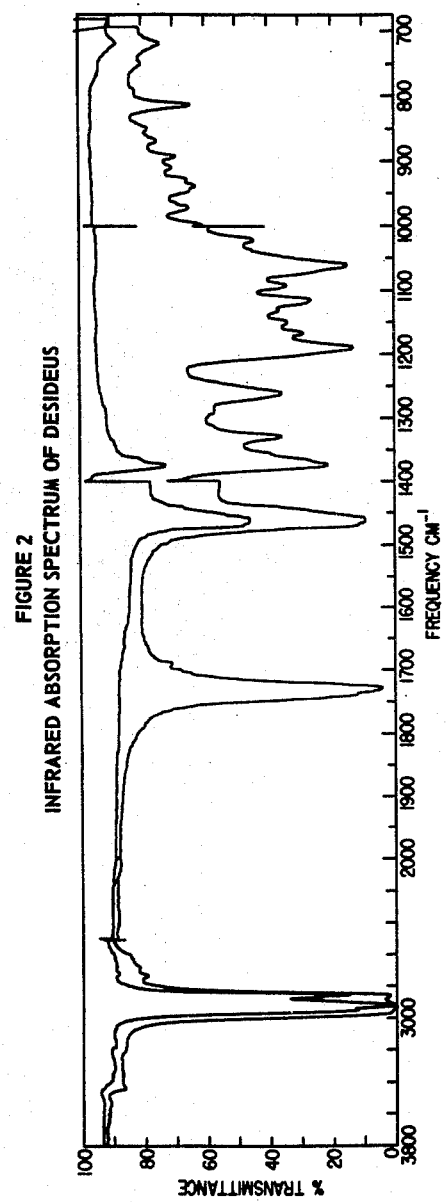

I—1-butanol, water (84:16), 16 hours.
II—1-butanol, water (84:16) plus 0.25% p-toluenesulfonic acid, 16 hours.
III—1-butanol, acetic acid, water (2:1:1), 16 hours.
IV—2% piperidine (v./v.) in 1-butanol, water (84:16), 16 hours.
V—1-butanol, water (4:96), 5 hours.
VI—1-butanol, water (4:96) plus 0.25% p-toulenesulfonic acid, 5 hours.

and also as shown in FIGURE 1 of the accompanying drawing, an infrared absorption spectrum expressed in reciprocal centimeters as follows and as shown in FIGURE 2 of the accompanying drawing,

| | |
| --- | --- |
| 2920* S† (oil) | 1060 S |
| 2860 S | 1020 M |
| 1730 S (C=O) | 970 W |
| 1690 W | 943 W |
| 1460 S (oil) | 936 W |
| 1372 S (oil) | 928 W |
| 1328 M | 908 W |
| 1260 M | 891 W |

Footnote on next column.

| | |
|---|---|
| 1188 S | 866 W |
| 1165 M | 848 W |
| 1150 M | 811 W |
| 1130 M | 747 W |
| 1115 S | 718 W (oil) |
| 1092 M | |

*Frequency tolerances are ±20 cm.$^{-1}$ in the 3800-2000 cm.$^{-1}$ range, ±10 cm.$^{-1}$ in the 2000-1700 cm.$^{-1}$ range, and ±5 cm.$^{-1}$ in the 1700-700 cm.$^{-1}$ interval. The spacing between adjacent bands shall be as indicated in the tabulation with a tolerance of one-fifth of the frequency tolerance.
† Band intensities are indicated as "S," "M," and "W," respectively, and approximated in terms of the backgrounds in the vicinity of the bands. An "S" band is of the same order of intensity as the strongest band in the spectrum; "M" bands are between one-third and two-thirds as intense as the strongest band, and "W" bands are less than one-third as intense as the strongest band. These estimates are made on the basis of a percent transmission scale.

and an elemental analysis as follows:

Calculated for $C_{40}H_{64}O_{12}$: C, 65.21; H, 8.70; O, 26.09.
Found: C, 65.42; H, 8.64; O, 25.85.

Desideus is further characterized by the following properties:

BIOLOGICAL ACTIVITY

Crystalline desideus is highly active against KB cells in the tissue cuture assay. The activity ranges from 50,000 to 100,000 KBU/mg.

This tissue culture assay is a measure of the inhibition of protein synthesis in a tissue culture using KB cells.

$$\frac{KBU/unit\ of\ material}{(mg.\ or\ ml.)} = \frac{that\ dilution\ of\ 1\ unit\ of\ materia\ which\ effects\ a\ 50\%\ inhibition\ of\ protein\ synthesis}{1000}$$

CRYSTALLOGRAPHY

The X-ray diffraction pattern of crystalline desideus shows the following points in interplanar spacings, expressed in Angstrom units:

| | |
|---|---|
| 9.40 | 4.29 |
| 7.43 | 3.93 |
| 6.70 | 3.45 |
| 6.06 | 3.28 |
| 5.40 | 2.79 |
| 4.72 | |

NUCLEAR MAGNETIC RESONANCE

Figure 3:
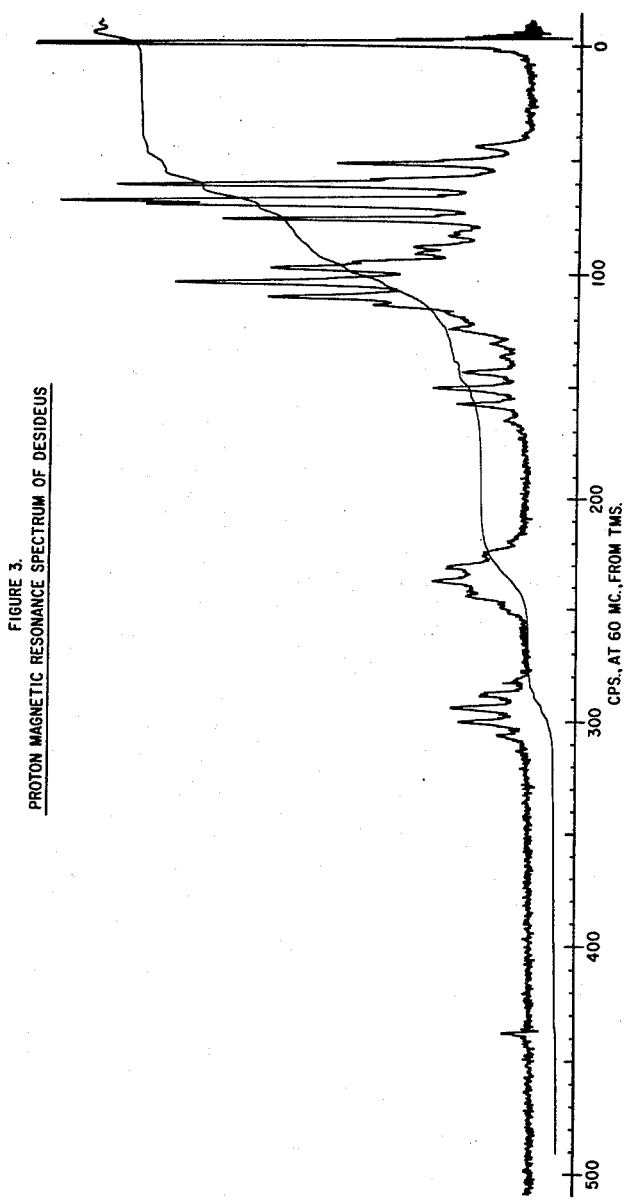

Desideus has a characteristic NMR spectrum as shown in FIGURE 3 of the accompanying drawing. The NMR spectrum was observed on a Varian A-60 spectrometer on a solution (ca. 0.5 ml., ca. 0.3 molar) of the sample of desideus in deuterated chloroform. The spectrum was calibrated against internal tetramethylsilane and the precision of the $\Delta\nu$ was >±1 c.p.s. Frequencies were recorded in c.p.s. downfield from tetramethylsilane.

(D) *Desideus perchlorate.*—Five hundred mg. of desideus, prepared as shown above, was dissolved in 10 ml. of methanol, and 0.5 ml. of 70 percent perchloric acid was added. The mixture was refrigerated overnight. Ten ml. of ether was added to the mixture to induce crystallization. After filtration, 310 mg. of desideus perchlorate crystals having a melting point of 153° C. were obtained. This product was recrystallized twice from methanol after which the melting point of the crystals increased to 164° C.

ELEMENTAL ANALYSIS

Calculated for $C_{40}H_{64}O_{12} \cdot HClO_4$: C, 57.37; H, 7.87; O, 30.60; Cl, 4.23 (mol. wt.=837.4). Found: C, 56.52; H, 8.04; O, 30.78; Cl, 4.20 [mol. wt.=844 (calculated from Cl content)].

We claim:
1. A composition of matter assaying at least 25 mcg./mg. of desideus, a compound which
   (a) is effective in hibiting the growth of gram positive bacteria, and
   (b) is effective in inhibiting the growth of KB cells in tissue culture;
and in its essentially pure crystalline form
   (c) is a neutral substance;
   (d) is soluble in halogenated hydrocarbons, aliphatic alcohols, water-immiscible polar organic solvents, alkanones, and water-miscible organic solvents;
   (e) has the following elemental analysis:
      Calculated for $C_{40}H_{64}O_{12}$: C, 65.21; H, 8.70; O, 26.09
      Found: C, 65.42; H, 8.64; O, 25.85
   (f) has a molecular weight as the perchlorate of 844;
   (g) has no significant ultravoilet absorption in the 220-320 m$\mu$ range;
   (h) has a characteristic infrared absorption spectrum as shown in FIGURE 2 of the accompanying drawing;
   (i) has a melting point range of 51-63° C.;
   (j) has a characteristic papergram as shown in FIGURE 1 of the accompanying drawing;
   (k) has a characteristic X-ray diffraction pattern expressed in Angstrom units as follows:

| | |
|---|---|
| 9.40 | 4.29 |
| 7.43 | 3.93 |
| 6.70 | 3.45 |
| 6.06 | 3.28 |
| 5.40 | 2.79 |
| 4.72 | | and
   (l) has a characteristic NMR spectrum as shown in FIGURE 3 of the accompanying drawing.
2. A novel compound, desideus, according to claim 1 in its essentially pure crystalline form.
3. The perchlorate of desideus as defined in claim 1.
4. A process which comprises cultivating *Streptomyces griseus* var. *desideus* in an aqueous nutrient medium under aerobic conditions until substantial desideus is produced.
5. A process which comprises cultivating *Streptomyces griseus* var. *desideus* in an aqueous nutrient medium containing a source of assimilable carbohydrate and assimilable nitrogen under aerobic conditions until substantial desideus is produced and isolating the desideus so produced.
6. A process according to claim 5 in which the isolation comprises extraction of the desideus from the water wet-mycelium with a water-miscible organic solvent.
   A process which comprises (1) concentrating the extract obtained in claim 6 to an aqueous solution, (2) extracting the aqueous solution with a water-immiscible organic solvent for desideus and (3) recovering desideus from the solvent extract.
8. A process according to claim 7 in which the recovery of the desideus from the solvent extract is accomplished by fractional liquid liquid extraction.
9. A compound as defined in claim 1, desideus, in its essentially pure form.

References Cited by the Examiner

Antimicrobial Agents and Chemotheraphy, 1961 (pages 169-177).

LEWIS GOTTS, *Primary Examiner.*

JULIAN S. LEVITT, *Examiner.*

UNITED STATES PATENT OFFICE
CERTIFICATE OF CORRECTION

Patent No. 3,183,155                      May 11, 1965

Gerald W. Camiener et al.

It is hereby certified that error appears in the above numbered patent requiring correction and that the said Letters Patent should read as corrected below.

Column 1, line 72, for "asimilation" read -- assimilation --; column 2, line 46, for "panacreatic" read -- pancreatic --; column 6, line 42, for "0.2" read -- 0.32 --; column 7, line 29, for "materia" read -- material --; column 8, line 4, for "hibiting" read -- inhibiting --; line 53, before "A process" insert -- 7. --.

Signed and sealed this 22nd day of November 1966.

(SEAL)
Attest:

ERNEST W. SWIDER                          EDWARD J. BRENNER
Attesting Officer                          Commissioner of Patents